Feb. 22, 1955
E. K. SCHWAIBOLD
2,702,451
COUPLING FOR WRISTBANDS TO WRIST WATCHES, BRACELET
LINKS, AND THE LIKE
Filed March 9, 1951
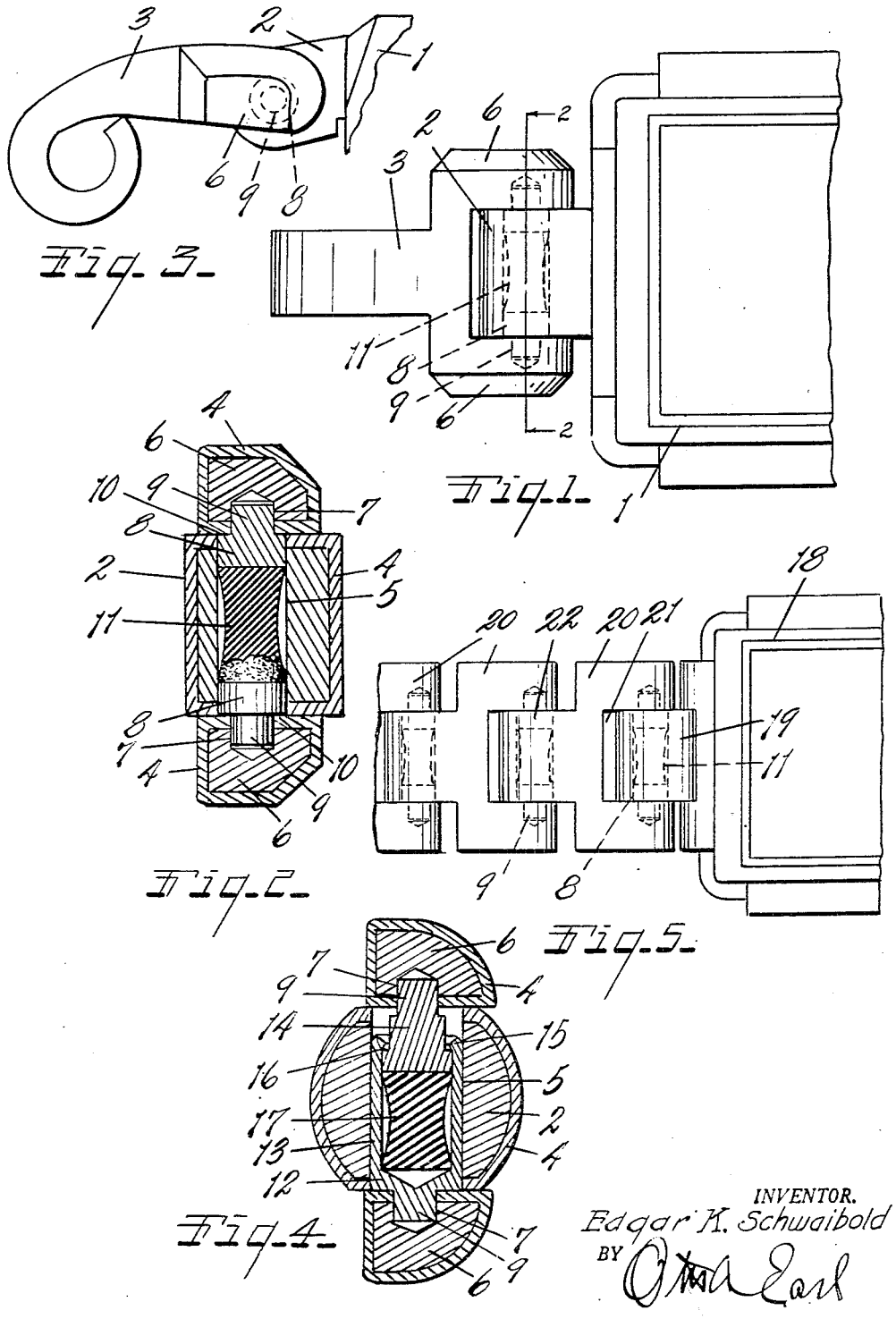
INVENTOR.
Edgar K. Schwaibold
BY
ATTORNEY.

United States Patent Office 2,702,451
Patented Feb. 22, 1955

2,702,451

COUPLING FOR WRISTBANDS TO WRIST WATCHES, BRACELET LINKS, AND THE LIKE

Edgar K. Schwaibold, Ludington, Mich., assignor to Star Watch Case Company, Ludington, Mich., a corporation of Michigan Application March 9, 1951, Serial No. 214,767

3 Claims. (Cl. 59—80)

This invention relates to improvement in couplings for wrist bands to wrist watches, bracelet links and the like.

The main objects of this invention are:

First, to provide a coupling for bands or straps to wrist watches, bracelet links and the like in which the parts may be quickly assembled without marring the surfaces of the parts coupled, and at the same time one in which the parts are securely connected.

Second, to provide a structure having these advantages in which the parts are economically produced and assembled.

Further objects in which:

Fig. 1 is a fragmentary plane view of a structure embodying my invention of a watch being shown conventionally and only a single link or pivoted lug for the attachment of a wrist band being illustrated.

Figure 2 is an enlarged sectional view on a line corresponding to line 2—2 in Fig. 1, the plating of the parts connected being indicated in greatly exaggerated thickness.

Figure 3 is a fragmentary side view of the link of the embodiment of Fig. 1.

Figure 4 is a sectional view corresponding to that of Fig. 2 of a modified form or embodiment of my invention.

Figure 5 is a fragmentary plan view of an embodiment of my invention in which the links of the bracelet are connected by the same type of coupling as is shown in Figs. 1 and 2.

In the accompanying drawing 1 represents a wrist watch having a lug 2 integral therewith or fixedly secured thereto. The link or pivoted lug 3 is forked to closely embrace the ends of the lug 2. In the embodiment illustrated the parts are shown as being plated, the plating 4 being shown in greatly exaggerated thickness. The lug 2 is provided with a transverse bore 5 of uniform diameter from end to end. The forks 6 of the arms of the link 3 have bores 7 in their inner faces aligned with the bore 5 when the parts are in assembled relation. These bores 7 are closed at their outer ends and are of a diameter less than the diameter of the bore 5. Pin members 8 are disposed within the bore 5 for longitudinal sliding movement therein, and have reduced journal portions 9 engaging the bearings or bores 7 in the fork 6. These reduced portions provide shoulders 10 on the pin members which are in thrust engagement with the forks of the link 3. The pin members are urged yieldingly outward by the resilient thrust member 11 arranged within the bore between the pin members as shown in Fig. 2, this thrust member being of rubber-like material, preferably synthetic rubber.

There are certain synthetic rubber-like materials commercially available which are less subject to deterioration than natural rubber. However, the member 11 is well protected so that it is not likely to deteriorate even when formed of suitable natural rubber. The member 11 is desirably of general hourglass shape which permits its being quite easily compressed longitudinally within the bore 5. In assembling, the pin, which consists of pin members 8 and the thrust member 11 is placed in the bore 5 of the member 2 and pin members collapsed or retracted within the bore 5 to permit the positioning of the arms 6 of the member 3 to align the bore 7 thereof with the pin members therein, and when the bores are aligned the pins are urged to engaging position with the bearing bores 7. This may be accomplished without abrading the surfaces of the parts joined, and no soldering or plugging of pin receiving openings are required as is the case with certain forms of pin couplings commonly used for wrist watches, for example.

In the embodiment shown in Fig. 4 the parts are formed the same as described with the exception that the pin member 12 has a tubular extension 13 receiving the pin member 14 which is retained therein by spinning or upsetting the edge 15 to serve as a stop for the shoulder 16. The thrust member 17 is enclosed in the tubular extension 13. In this embodiment of my invention the pin parts are completely assembled before introducing into bore 5 of the lug 2. In the embodiment shown in Fig. 5 the case 18 is provided with a lug 19 with which the end link of a link bracelet is engaged, the links 20 of the bracelet being of the same design and slotted at one end to provide the forks 21 receiving the lugs 22 of adjacent links, which corresponds in assembling to the lug 19 on the watch case. The pins are the same as shown in Figs. 1 and 2, although the embodiments shown in Fig. 4 might be employed in the same way.

It is desired to point out that it has been a common practice where the case if of precious metal, gold for example, to drill a hole in the parts to receive a pin which is also of gold, the pin being soldered to one part after it is inserted in the drilled hole. This requires skill and sometimes the solder runs sufficiently to prevent any pivoting action of the parts joined. The ends of the pin must be filed or finished to conform to the outside shape of the parts, which also requires skill and often results in damage to the finish. In gold filled cases or plated cases the pin must be made of gold, and this in addition to the filing and finishing operations to make the ends conform to the shape of the part renders this type of joint very expensive, and it is excessively high in a gold filled or plated structure. The resilient thrust member being of rubber-like material allows parts of watch cases, wrist bands, bracelet links and the like to be securely held together in limited spaces which would not permit the use of metallic springs or coils. Where the bore of necessity must be relatively small due to the dimensions of the member in which it is disposed, the thrust member of rubber-like material disposed in such bore will urge the pin member outwardly with sufficient force to securely hold the pin in locking engagement with the member into which it projects, which would not be readily permitted by a coiled spring of the dimensions to be received in such bore.

My invention eliminates various operations or steps necessary in previous practices, and relatively cheap or economical materials may be used.

The rubber thrust members are not subject to corrosion as is the case with metal springs.

I have illustrated and described a highly practical embodiment thereof. I have not attempted to illustrate other embodiments as it is believed this discloses well what is desired.

I claim:

1. A device of the class described, comprising coacting pivotally connected members, one member being provided with a lug having flat parallel end bearing faces and a bore of uniform diameter extending transversely therethrough and opening to said faces, the other member having a coacting pair of lugs spaced to receive said first named lug between them and having flat inner bearing faces in coacting bearing engagement with the end faces of said first named lug and having inwardly facing pin bearings aligned with and of a diameter less than said bore, said pin bearings being closed at their outer ends, a pivot pin for said member comprising a pair of pin members having body portions disposed within and slidable in said bore and journal portions disposed in said pin bearings and shouldered to engage the said bearing faces of said pair of lugs, and a resilient thrust member of rubber-like material having a reduced portion intermediate its ends of lesser diameter than that of the bore disposed in said bore between said pin members with its ends in abutting relation to the inner ends thereof and acting to urge them yieldingly outward, the end portions of said thrust member being of a diameter corresponding approximately to the diameter of the bore in said first named lug, the reduced portion of the thrust member providing an annular recess between the ends thereof to facilitate collapsing of the thrust member within the bore.

2. A device of the class described, comprising coacting pivotally connected members, one member being provided with a lug having flat parallel end bearing faces and a bore of uniform diameter extending transversely therethrough and opening to said faces, the other member having a coacting pair of lugs spaced to receive said first named lug between them and having flat inner bearing faces in coacting bearing engagement with the end faces of said first named lug and having inwardly facing pin bearings aligned with and of a diameter less than said bore, said pin bearings being closed at their outer ends, a pivot pin for said member comprising a pair of pin members having body portions disposed within and slidable in said bore and journal portions disposed in said pin bearings and shouldered to engage the said bearing faces of said pair of lugs, and a resilient thrust member of rubber-like material disposed in said bore between said pin members therein having a reduced portion intermediate its ends of lesser diameter than that of the bore with its ends in abutting relation to the inner ends of the pin members and acting to axially urge the pin members yieldingly outward with their said shoulders in bearing engagement with said bearing faces of said pair of lugs.

3. In a device of the class described, the combination of coacting pivotally connected members, one member having a lug provided with parallel end bearing faces and with a bore of uniform diameter opening to said faces, the other member having a pair of lugs spaced to receive the lug of said first member between them and having flat inner bearing faces in lateral supporting thrust engagement with the end bearing faces of said first named lug, and said pair of lugs having pin bearings opening to their said bearing faces and aligned with the bore of said first lug, said pin bearings being closed at their outer ends, and pin members fittingly disposed and longitudinally collapsible in said bore of said first lug and having journal positions disposed in said pin bearings in said second pair of lugs, and a resilient thrust member of rubber-like material having a reduced portion intermediate its ends of lesser diameter than that of the bore disposed within said bore in said first lug between said pin members therein and in abutting supporting engagement therewith and acting to axially urge the pin members yieldably outward into bearing engagement with said pin bearings of said pair of lugs and the shoulder of the pins against said bearing faces of said pair of lugs, said thrust member being resiliently compressible permitting the retraction of the pin members into the bore of the said first lug and the positioning thereof between the pair of lugs, the thrust member acting to project the pins into the bearings of the pair of lugs when the pins are aligned therewith.

References Cited in the file of this patent

UNITED STATES PATENTS

| Number | Name | Date |
|---|---|---|
| 1,804,134 | Unger | May 5, 1931 |
| 1,869,793 | Bailey | Aug. 2, 1932 |
| 1,977,896 | Saurer | Oct. 23, 1934 |
| 2,012,054 | Ritter | Aug. 20, 1935 |
| 2,163,208 | Moody | June 20, 1939 |
| 2,342,499 | Sproul | Feb. 22, 1944 |
| 2,392,092 | Konikoff | Jan. 1, 1946 |
| 2,461,693 | McAloon | Feb. 15, 1949 |